Figure 1:
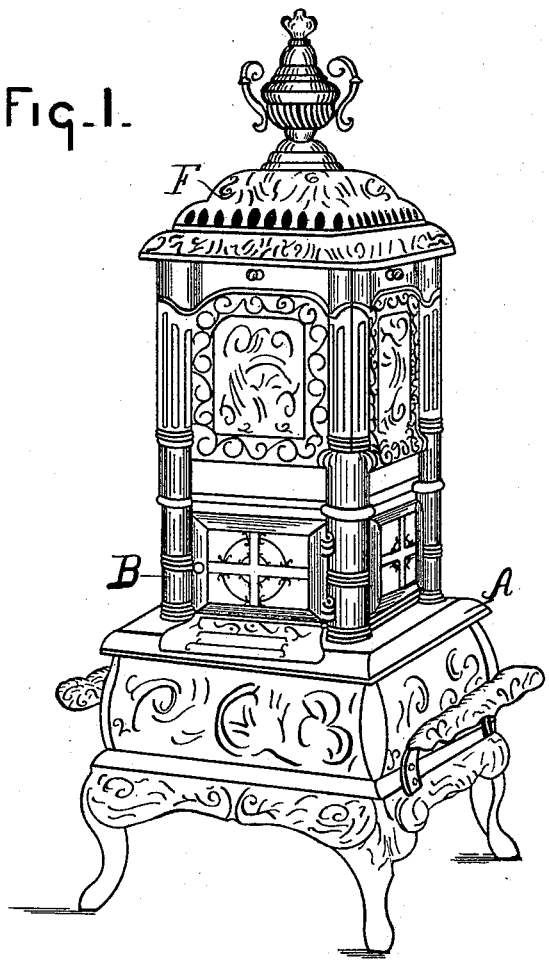

(No Model.) 3 Sheets—Sheet 1.

L. F. ZIMMERLING.
STOVE.

No. 486,948. Patented Nov. 29, 1892.

WITNESSES
F. Clough.
Effie J. Cooft.

INVENTOR
Sissette F. Zimmerling
by Parker and Burton
her Attorneys.

(No Model.) L. F. ZIMMERLING. 3 Sheets—Sheet 2.
STOVE.
No. 486,948. Patented Nov. 29, 1892.
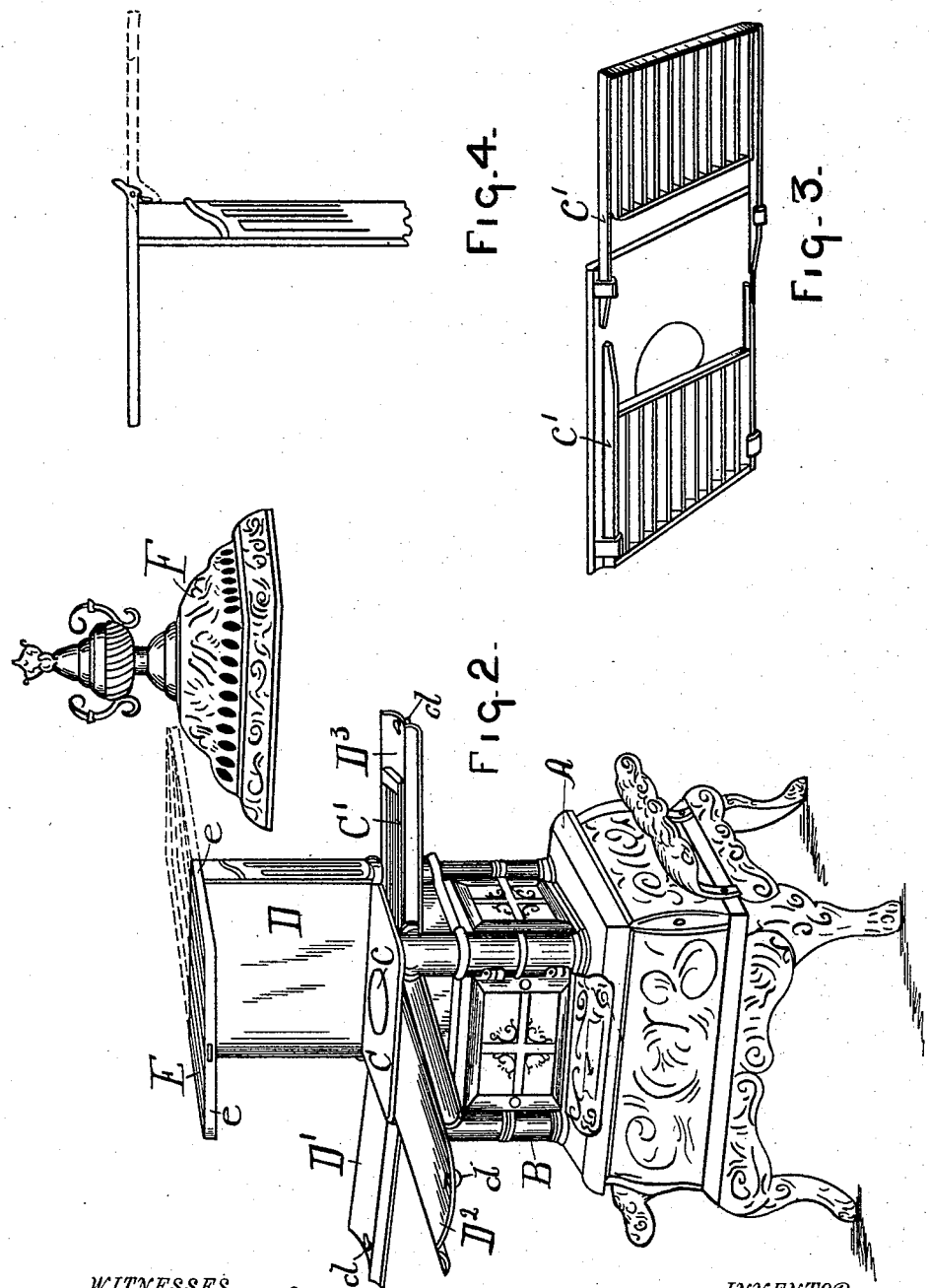
WITNESSES
F. Clough.
Effie I. Croft.
INVENTOR
Sissette F. Zimmerling
by Parker and Burton
her Attorneys.

(No Model.) 3 Sheets—Sheet 3.
L. F. ZIMMERLING.
STOVE.
No. 486,948. Patented Nov. 29, 1892.
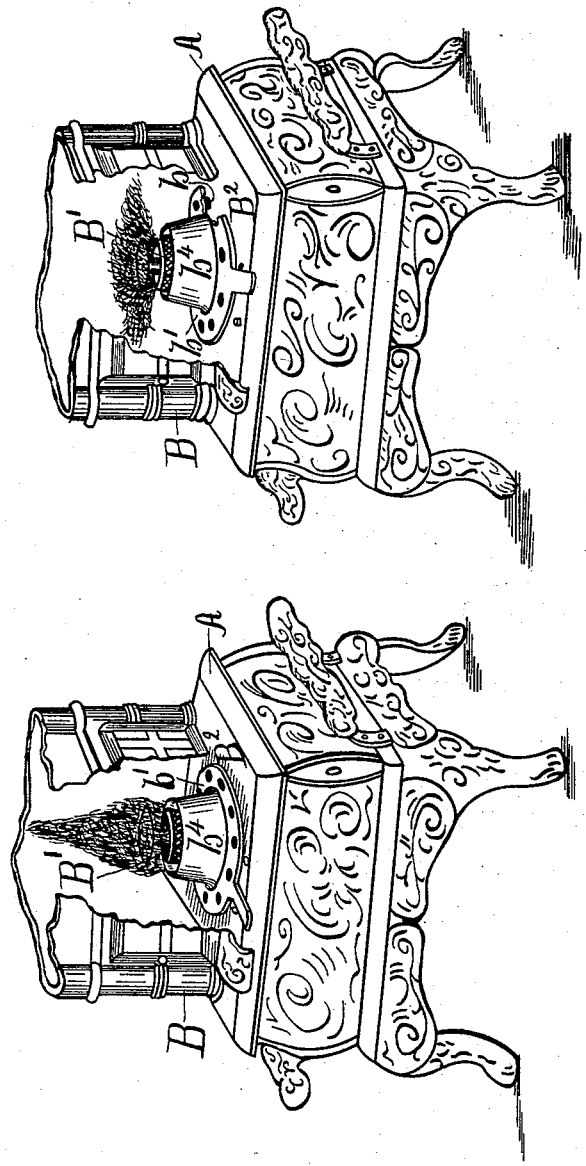
WITNESSES
F. Clough.
Effie J. Croft.
INVENTOR
Lisette F. Zimmerling
by Parker and Burton
her Attorneys.

UNITED STATES PATENT OFFICE.

LISSETTE F. ZIMMERLING, OF JACKSON, MICHIGAN.

STOVE.

SPECIFICATION forming part of Letters Patent No. 486,948, dated November 29, 1892.

Application filed January 8, 1892. Serial No. 417,426. (No model.)

*To all whom it may concern:*

Be it known that I, LISSETTE F. ZIMMERLING, a citizen of the United States, residing at Jackson, county of Jackson, State of Michigan, have invented certain new and useful Improvements in Stoves; and I declare the following to be a full, clear, and exact description of the invention, such as will enable others skilled in the art to which it pertains to make and use the same, reference being had to the accompanying drawings, which form a part of this specification.

My invention relates to stoves; and its object is to produce a combined heating and cooking stove, and its special object is to so construct the upper portion of the stove that the side walls may be opened outward and downward to provide supports for grates, forming flues through which to conduct the heat from the burner below to articles to be heated placed over the doors, and to be so arranged that when closed they form the walls of a compartment that may be used for a cooking-oven or for heating purposes.

In the drawings, Figure 1 is a view showing the stove arranged for heating. Fig. 2 is a view showing the stove arranged for cooking. Fig. 3 is a view of the warming-shelf, showing the manner of hinging it to the stationary side wall of the oven. Fig. 4 is a view showing the details of the grates and the manner of supporting them. Fig. 5 is a view showing the interior of the stove and the burner with the register $b'$ opened. Fig. 6 is a view of the interior of the stove, showing the burner and the register $b'$ closed.

In the drawings, A is the base of the stove. B is the lower portion, containing the burner B', inclosed in a compartment in the portion B of the stove. The floor of this compartment $B^2$ is provided with a series of openings $b$, over which moves a register $b'$, also provided with openings and with portions adapted to close the openings in the floor of the compartment. The purpose of this register is to regulate the amount of air permitted to pass up through this lower compartment of the stove alongside the burner. The burner B' passes up through an opening in the floor, around which opening is a flange $b^4$. This opening is large enough to permit a passage of air around the burner sufficient for all purposes of combustion on the outside of the burner. Directly over the burner is the plate C, supported on the portion B of the stove and provided with a central opening $c$. This central opening may be provided with a stove-plate.

D is the back side wall of the upper compartment of the stove when used for heating purposes. The doors D', $D^2$, and $D^3$ are hinged to the plate C, and are adapted to swing upward and form three side walls of the upper compartment.

E is a grate hinged to the upper part of the stationary side wall D, and forms a grate-top to the upper heating-compartment of the stove when the doors are swung upward into position to form this compartment, and when the doors are down, as shown in Fig. 2, this grate forms a heating-shelf extending out over the plate C. It is also adapted to swing over back of the stove into the position shown in dotted lines in Fig. 2, where it serves as a cold-shelf. It is provided around three sides with the flanges $e$, against which the upper edges of the doors rest when they are closed. The doors are provided with catches $d$, adapted to swing under the flange $e$ when the doors are closed and hold them in position and form the doors into rigid walls for the compartment inclosed within. After these doors are closed and fastened, as described, the crown F can be placed in position, as shown in Fig. 1, thus completing a heating-stove properly inclosed. Under the plate C are supported the grates C', having a sliding connection with the plate and adapted to be drawn out over the doors. These grates are formed with the depending flange $c'$, so as to form an inclosed flue above each door, with an outlet at the ends. These grates are designed to support cooking utensils or other articles to be heated on the side of the stove, and when the opening $c$ in the plate C is closed by placing an article over it to be heated or closed by a stove-lid the heated products of combustion from the burner below are forced out through the flues formed by the grates and may be utilized for heating any article placed on the grates.

When the grate E is swung back in the position shown by dotted lines, any large article to be heated—such as a boiler—can be placed on the stove and the heat through the central opening c and through the grates over the side doors utilized for heating it.

The register b' operates to regulate the movement of the heated products of combustion upward through the stove as they are to be used either for cooking or for heating the stove when it is used as a heater. If the stove is closed and being used as a heater only, then the register is closed and the flame of the burner permitted to flare toward the walls of the stove; but when the stove is thrown open for cooking purposes the register is opened and the draft of air around the burner increased and the flame caused by the extra current of air to move inward and focus under the utensil immediately above the burner.

The construction herein shown may be used in connection with any kind of a burner, either for gas or oil.

An oven may be provided for baking purposes by closing two of the doors and placing the crown in position over them and using the third door as the door of the oven. This brings directly over the burner an oven that is formed from the same parts of the stove that are utilized when it is converted into a cook-stove. For heating purposes the stove is closed and the register in the bottom of the stove preferably closed to retain the heat within and heat the stove. The stationary wall D may be provided with a smoke-outlet, if desired, so that in using the stove for heating purposes the products of combustion from the burner can be conducted to the chimney, if desired.

What I claim is—

1. In a stove, the combination of a burner, a plate above said burner, doors hinged to said plate and adapted to close and form the side walls of a compartment above said plate, and grates engaged with said plate and adapted to draw out on said doors when they are opened, substantially as described.

2. In a stove, the combination of a burner, a plate above said burner, doors hinged to said plate and adapted to close and form the side walls of a compartment above said plate, and grates on which to support cooking utensils on the sides of said plate, said grates forming flues over said doors, substantially as described.

3. In a stove, the combination of a burner, a compartment above said burner having one of its side walls stationary and the remaining side walls adapted to swing outward, grates forming flues above said walls, and a warming-shelf supported above said compartment and forming a part of said stove when used as a heater, substantially as described.

4. In a stove, the combination of a burner, a compartment above said burner having one of its side walls stationary and the remaining side walls adapted to swing outward, and a warming-shelf supported on said stationary wall and adapted to swing back and form a cold-shelf, substantially as described.

5. In a stove, the combination of an oven having a stationary wall, doors opening downward and outward, a warming-shelf above said oven, a crown closing said oven above said shelf, and grates for supporting articles to be heated over said doors when opened, substantially as described.

6. In a stove, the combination of a combustion-chamber and a compartment above said combustion-chamber having a fixed upright wall and the remaining walls adapted to be swung downward and outward and a warming-shelf supported by said fixed upright wall and adapted to retain its position above the combustion-chamber when the movable walls are so swung outward and adapted to form the top of the compartment when the movable walls are closed, substantially as described.

7. In a stove, the combination of a combustion-chamber, a compartment above said combustion-chamber having one fixed upright wall and three walls adapted to swing outward and downward, and a shelf forming the top of said compartment and adapted to be swung backward from over the combustion-chamber, substantially as and for the purpose described.

In testimony whereof I sign this specification in the presence of two witnesses.

LISSETTE F. ZIMMERLING.

Witnesses:
W. R. BROWN,
ANNA STOKOE.